July 17, 1956            J. J. MANIS            2,754,868
EXTERNAL COOLANT BAG FOR VEHICLE RADIATORS
Filed Nov. 8, 1954
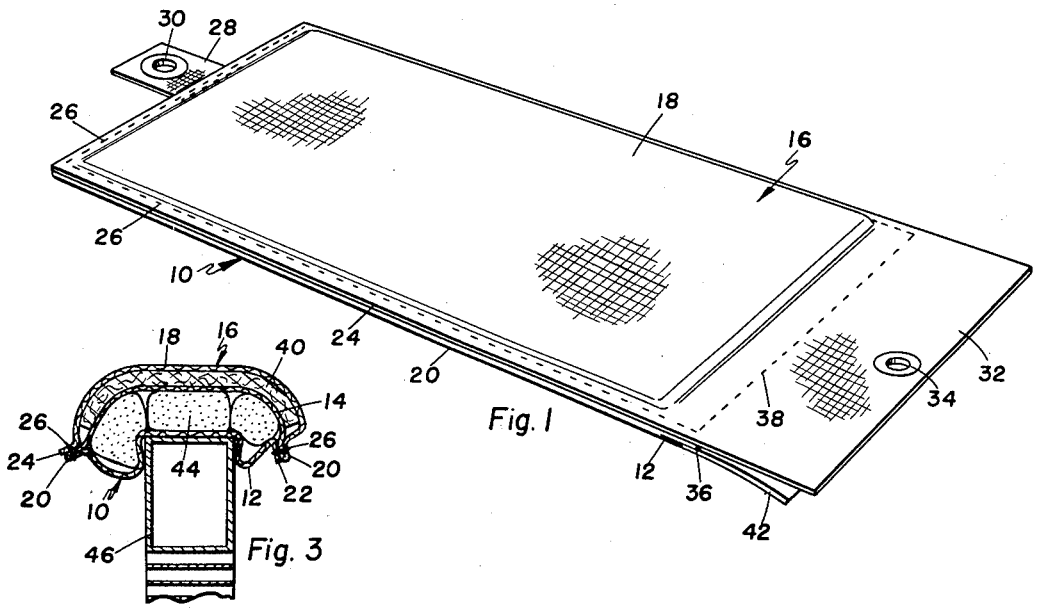
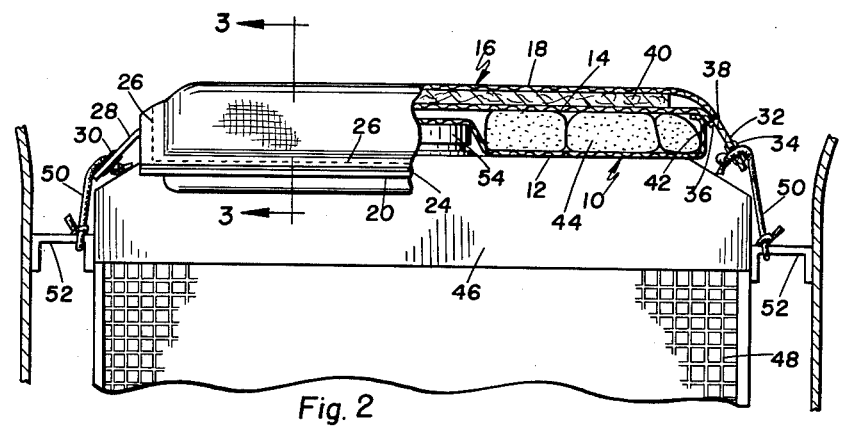
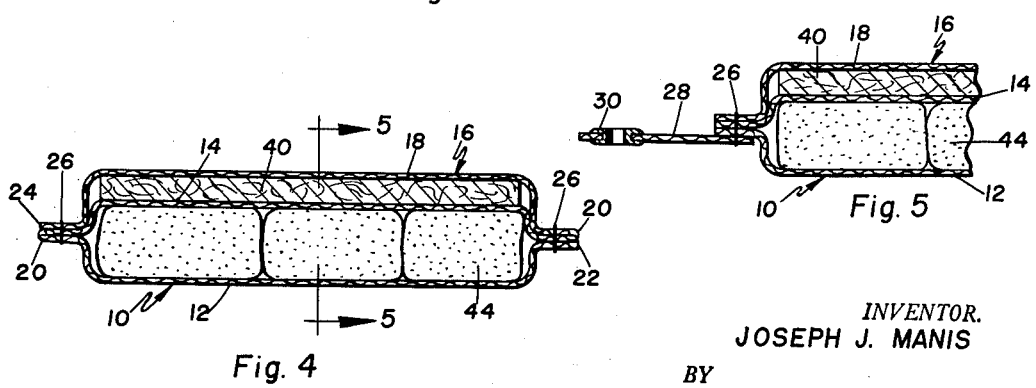
INVENTOR.
JOSEPH J. MANIS
BY
Knox & Knox 2,754,868
Patented July 17, 1956

2,754,868

EXTERNAL COOLANT BAG FOR VEHICLE RADIATORS

Joseph J. Manis, La Mesa, Calif.

Application November 8, 1954, Serial No. 467,579

3 Claims. (Cl. 150—2.1)

The present invention relates generally to engine cooling systems and more particularly to an external coolant container for vehicle radiators.

The primary object of this invention is to provide a coolant container which may be filled with a suitable coolant such as Dry Ice and attached to the upper tank portion of a vehicle radiator to assist the cooling of the fluid therein.

Another object of this invention is to provide a special container which can be readily secured in place, especially designed coacting closure and tie down flaps being provided.

Another object of this invention is to provide a coolant container which is insulated on one side to prevent loss of coolant due to external heat.

Another object of this invention is to provide a coolant container which is substantially flexible and is thus easily draped over the tank of a vehicle engine radiator to contact the maximum possible area of the tank.

Another object of this invention is to provide a coolant container which can be folded flat for convenient storage when not in use.

Another object of this invention is to provide an external coolant container for vehicle radiators, which is adapted for fabrication from many different materials, so that the choice of material can be according to the dictates of availability and price considerations, the exact sizes and proportions being matters easily determined to suit particular conditions and needs.

Another object of this invention is to provide an external coolant container for vehicle radiators which is inexpensive and practicable to manufacture.

Finally, it is an object to provide a coolant container of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure and wherein similar characters of reference indicate similar or identical elements and portions through the specification and throughout the views of the drawing, and in which:

Fig. 1 is a perspective view of the coolant container.

Fig. 2 is a front elevation view, partially cut away, showing the container attached to a radiator.

Fig. 3 is a sectional view taken on the line 3—3 of Fig. 2.

Fig. 4 is an enlarged transverse sectional view of the container similar to Fig. 3.

Fig. 5 is a fragmentary sectional view taken on the line 5—5 of Fig. 4.

Referring now to the drawing in detail, the coolant container comprises an elongated bag portion 10, having a lower panel 12 and an upper panel 14, and a pocket portion 16 formed by a pocket panel 18 and said upper panel. For simplicity of construction these three panels may be made from a single piece of material return folded twice as in Fig. 4, to provide the three layers of material. The return folded edges 20 constitute the longitudinal edges of the container and are secured together, along with the edge portions 22 and 24 of the lower panel 12 and pocket panel 18, respectively, by stitching 26. The three panels are also secured together at one end by further stitching 26, so that the container is closed at one end and on both longitudinal sides. Secured to the container at the closed end is a tab 28 having therein a grommet 30.

At the other end of the container the pocket panel 18 is extended to provided an outer flap 32 having a grommet 34 therein adjacent the end edge. The end edge 36 of the upper panel 14 is secured to the outer flap 32 by stitching 38 to close the pocket portion 16 which is filled with any suitable insulation material 40, such as glass fiber, asbestos, or the like. The lower panel 12 is extended to provide an inner flap 42.

In use, the bag portion 10 is filled with a suitable coolant such as Dry Ice indicated at 44. This Dry Ice can be inserted in block or chunk form so that the bag portion is still substantially flexible when filled. The bag portion 10 is closed by folding the inner flap 42 inwardly and folding the outer flap 32 over said inner flap, as in Fig. 2, thus retaining the Dry Ice 44. The container is placed on top of the tank 46 of a vehicle radiator 48 and is secured thereon by tie cords 50 passed through the grommets 30 and 34 and tied to convenient portions of the vehicle structure, such as the radiator stay brackets 52. It will be evident that when the outer flap 32 is tied down by the tie cord 50, the inner flap 42 is held tightly in place, so preventing loss of the Dry Ice 44. It should also be noted that the central portion of the container is generally free of Dry Ice so that the container fits closely over the radiator filler cap 54. The container drapes over the front and rear portions of the tank 46, as shown in Fig. 3, and contacts a considerable area of the tank surface to increase the cooling effect of the Dry Ice.

The insulation 40 protects the Dry Ice 44 from external heat, such as caused by the sun heating the hood over the engine and radiator. Thus the useful life of the Dry Ice is prolonged.

The coolant container is particularly useful in hot climates or when extended trips must be made through hot regions. Supplies of cold water to refill the radiator or replace the water therein are often difficult to obtain when needed, and the coolant container provides the additional cooling effect needed to ensure the safe and efficient operation of the engine cooling system.

It should be understood that the use of the coolant container is not limited to vehicles. The container may be applied to various types of liquid cooled engines such as in power plants, pumps, or the like. The securing means can be suitably modified.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variations from the forms of the invention disclosed herein may be made without departure from the spirit and scope of the invention, and that the specification and drawing are to be considered as merely illustrative rather than limiting.

I claim:

1. A coolant container for attachment to a radiator, comprising: a generally rectangular flexible bag having an upper panel and a lower panel marginally secured together on three sides; said bag portion having an open end; a pocket panel marginally secured to said upper panel and defining a pocket therewith; a filling of insulation material in said pocket; an inner flap integral with said lower panel for closure of said open end; an outer flap integral with said pocket panel and foldable over said inner flap; and means for securing the container to a support.

2. A coolant container for attachment to a radiator, comprising: a generally rectangular flexible bag having an upper panel and a lower panel marginally secured together on three sides; said bag portion having an open end; a pocket panel marginally secured to said upper panel and defining a pocket therewith; a filling of insulation material in said pocket; an inner flap integral with said lower panel for closure of said open end; an outer flap integral with said pocket panel and foldable over said inner flap; said lower panel, upper panel and pocket panel comprising a unitary piece of material return folded at the longitudinal edges of the bag portion; and means for securing the container to a support.

3. A coolant container for attachment to a radiator, comprising: a generally rectangular flexible bag having an upper panel and a lower panel marginally secured together on three sides; said bag portion having an open end; a pocket panel marginally secured to said upper panel and defining a pocket therewith; a filling of insulation material in said pocket; an inner flap integral with said lower panel for closure of said open end; an outer flap integral with said pocket panel and foldable over said inner flap; said lower panel, upper panel and pocket panel comprising a unitary piece of material return folded at the longitudinal edges of the bag portion; a grommet in said outer flap to receive tie means for securing one end of the container to a support; and a tab fixed to the other end of the container to receive further tie means for securement to a support.

References Cited in the file of this patent
UNITED STATES PATENTS

| | | |
|---|---|---|
| 1,546,016 | Eisele | July 14, 1925 |
| 1,567,931 | Epler | Dec. 29, 1925 |
| 1,724,799 | Jensen | Aug. 13, 1929 |
| 1,933,441 | Laursen | Oct. 31, 1933 |
| 1,964,962 | Rosenblum | July 3, 1934 |
| 2,288,745 | Sammis | July 7, 1942 |